R. C. LOWRY & L. F. WINTER.
BUNDLING MACHINE.
APPLICATION FILED NOV. 13, 1907.

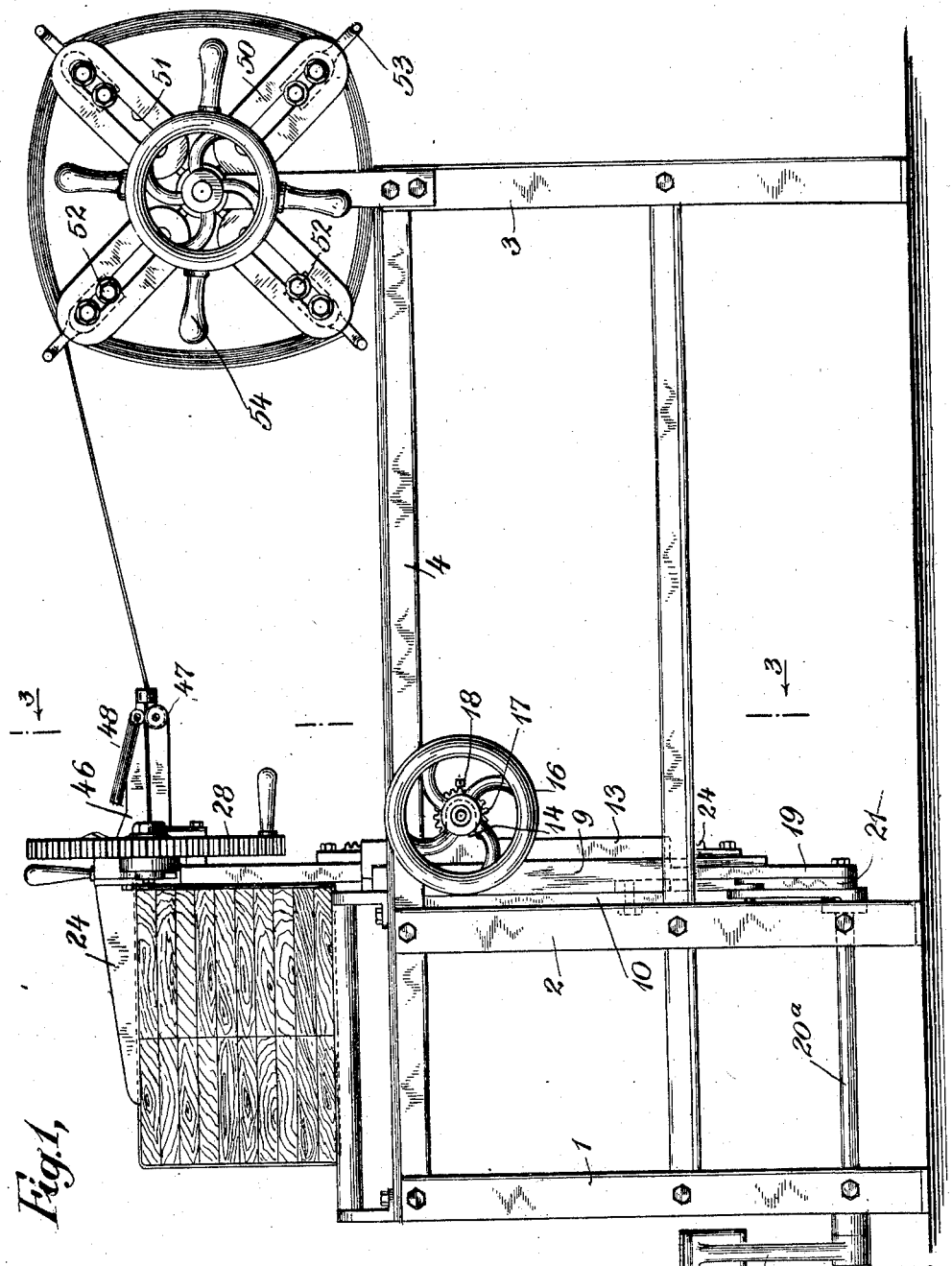

972,389.

Patented Oct. 11, 1910.
4 SHEETS—SHEET 2.

WITNESSES:
L. L. Jones

INVENTORS
R. C. Lowry
L. F. Winter
BY
ATTORNEYS

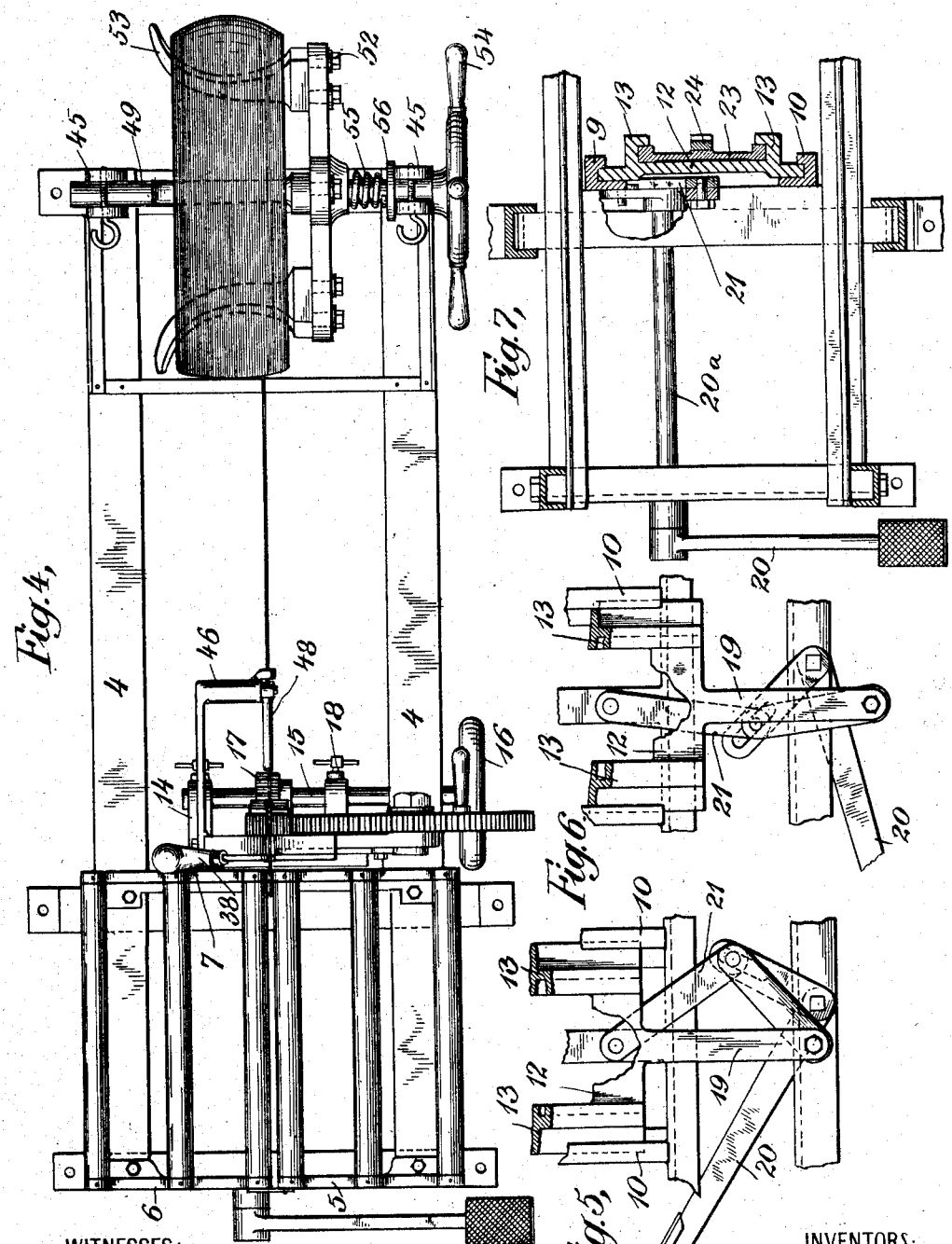

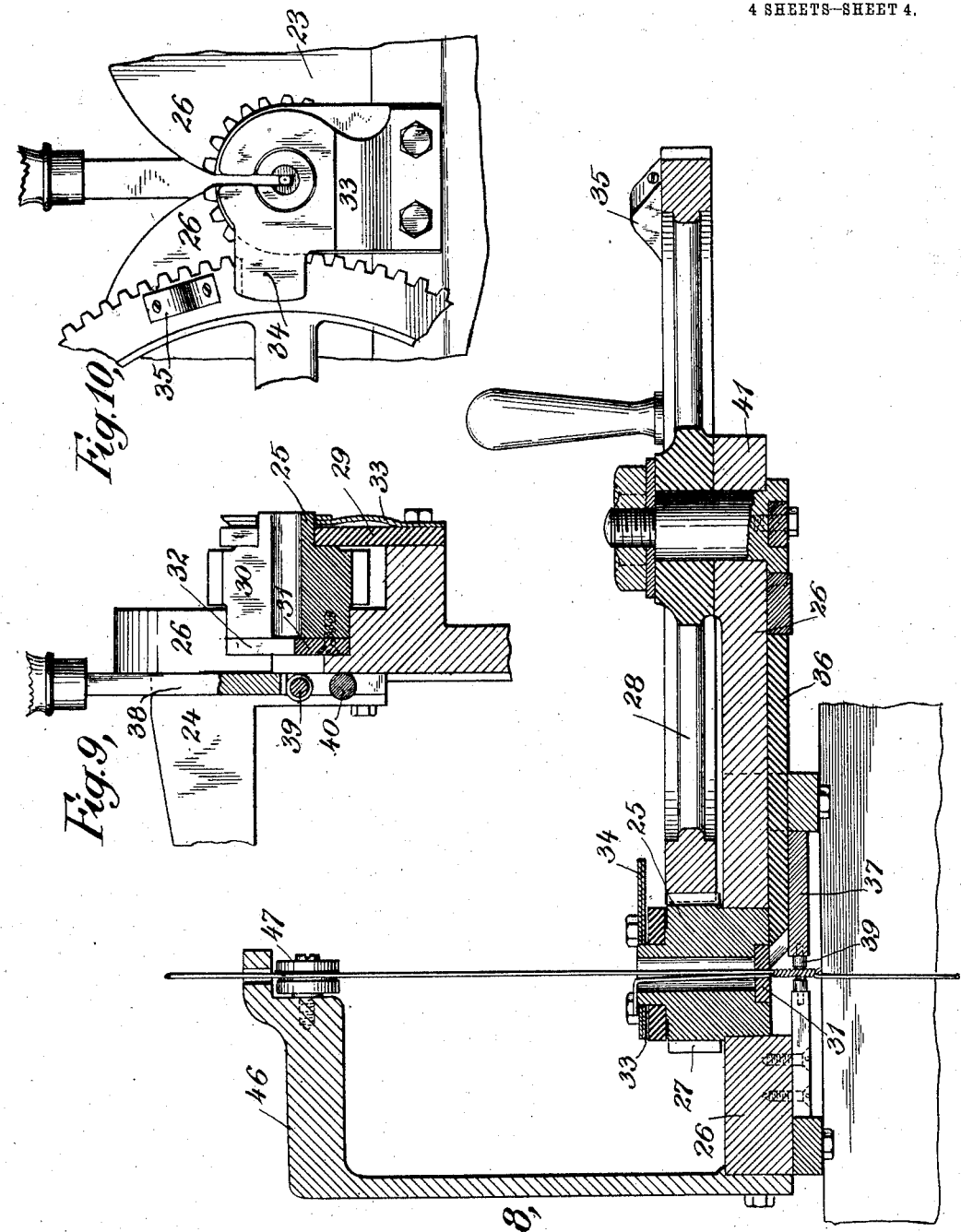

UNITED STATES PATENT OFFICE.

ROBERT C. LOWRY AND LOUIS F. WINTER, OF NEW YORK, N. Y.; SAID WINTER ASSIGNOR TO SAID LOWRY.

BUNDLING-MACHINE.

972,389.  Specification of Letters Patent.   Patented Oct. 11, 1910.

Application filed November 13, 1907. Serial No. 402,050.

*To all whom it may concern:*

Be it known that we, ROBERT C. LOWRY and LOUIS F. WINTER, both citizens of the United States, residing at New York, in the county and State of New York, have invented certain new and useful Improvements in Bundling-Machines; and we do hereby declare the following to be a full, clear, and exact description of the invention, such as will enable others skilled in the art to which it appertains to make and use the same.

Our invention relates to improvements upon the bundling machine disclosed in U. S. Letters Patent No. 799,174, granted September 12th, 1905, to Robert C. Lowry and Frank A. Reynolds and has for its object to simplify and strengthen the parts, and to increase the range of usefulness and efficiency of machines of that type.

Figure 3:
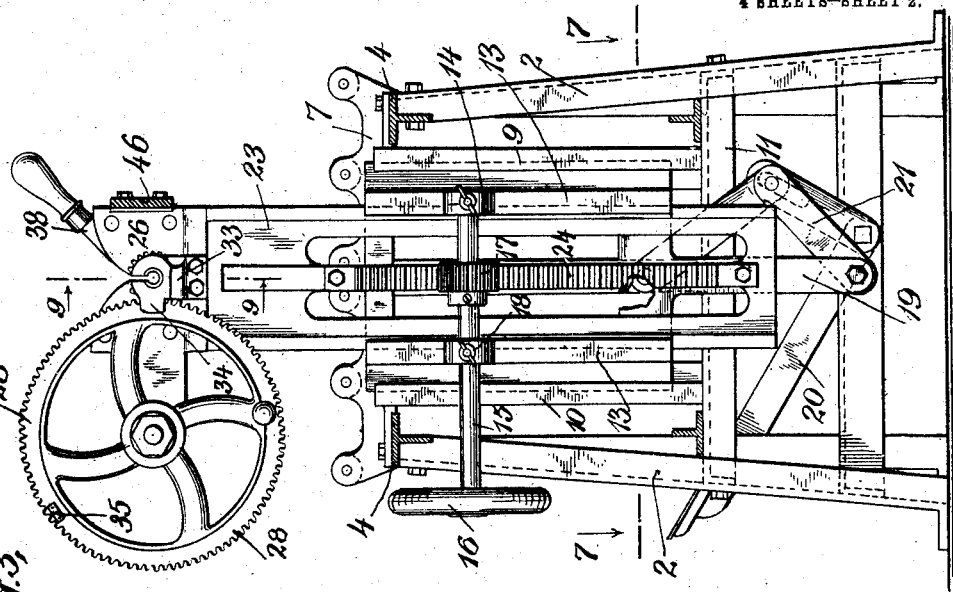
Figure 2:
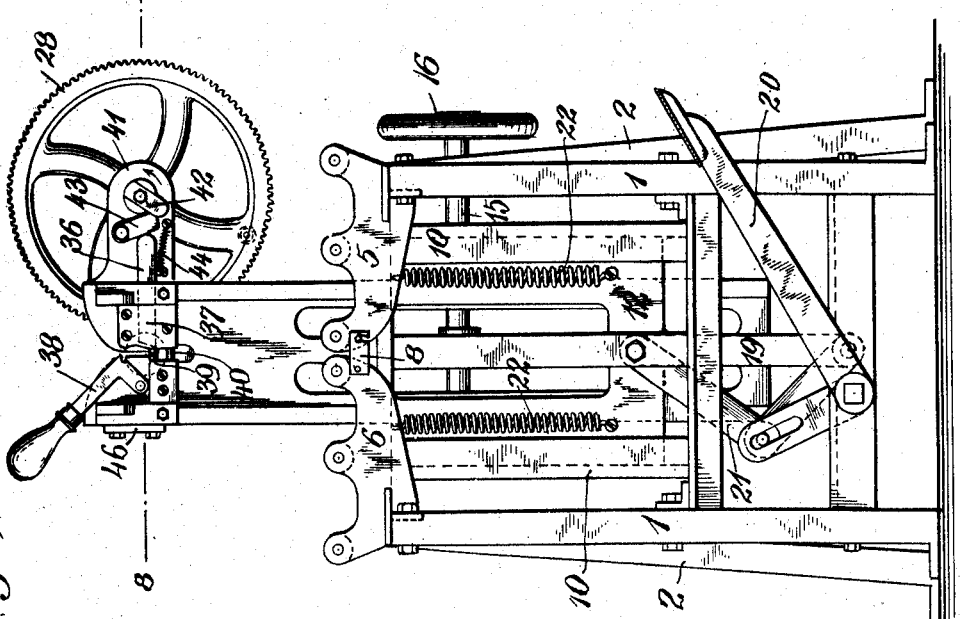

In the accompanying drawings, Figure 1 is a side elevation of a machine embodying our improvements; Fig. 2 is a front end view; Fig. 3 is a section on the line 3—3 of Fig. 1; Fig. 4 is a top plan view; Fig. 5 is a detail view showing the treadle in its elevated position; Fig. 6 is a similar view with the treadle in its depressed position; Fig. 7 is a plan of the treadle and its associated parts and connections to the carrier plate on the line 7—7 of Fig. 3; Fig. 8 is a sectional plan on the line 8—8 of Fig. 2; Fig. 9 is a section on the line 9—9 of Fig. 3, and Fig. 10 is a detail elevation looking from the rear, of the parts shown in Fig. 9.

The supporting framework of the apparatus consists of the uprights 1, 2 and 3 on each side of the frame. On the upper ends of these uprights are supported longitudinally extending bars 4 which, in the construction illustrated, are made of T-irons. The under frame is further tied together by the longitudinally and transversely extending tie bars as shown, the whole forming a rigid frame or support upon which the operating mechanism is mounted. The improved roller table, on which the material to be bundled is supported, comprises a series of rollers (6 are shown) journaled in the front brackets 5 and 6 and in the rear bracket 7, these brackets being bolted to the members 4, and so constructed that the central rollers are in close proximity to one another, thus forming a narrow guide slot for the binding wire, which slot guides the wire into such position that it is always bound at right angles to the axis of the bundle on the table.

Pivoted on the bracket 6 and adapted to engage a pin on the bracket 5 is a latch 8, as shown in Fig. 2, the purpose of which will be hereafter described. Back of and depending below the rear brackets 7, and preferably cast in a single piece therewith, are two guides 9 and 10 connected together at the bottom by the cross-piece 11 and secured thereby to the supporting framework. Slidably mounted in these guides 9 and 10 is a carrier plate 12 which is of cast metal rectangular in form and carries the two guides 13. On these guides 13 are formed bosses 14 in which is journaled the shaft 15 carrying a hand-wheel 16 and a pinion 17. This shaft is provided with means for locking it in engagement with its bearings, which means comprise set screws 18. It will be understood that any other appropriate locking means may be substituted for these set-screws.

Cast integral with the carrier plate 12 and depending therefrom is an arm 19 which is connected with the bent-arm treadle 20 through the shaft 20$^a$ and toggle 21. To the front face of the carrier plate 12 are attached a pair of heavy spiral springs 22 and these springs extend upwardly and are secured to the supporting framework so that the springs tend to lift the carrier plate into its highest position.

Adjustably mounted in the guides 13 of the carrier plate is the head plate 23, which carries on its rear surface the rack 24 with which the pinion 17 engages. By means of this rack and pinion and the hand-wheel 16, the position of the head-plate in the carrier plate may be adjusted, and after being adjusted the position may be fixed by tightening the set screws 18. This head-plate 23 carries the forwardly and horizontally extending presser arms 24 which are adapted to clamp the bundle on the roller table when the treadle 20 is depressed.

The improved construction of the wire twisting mechanism will be understood from an inspection of Figs. 8, 9 and 10 of the drawings from which it will be seen that the twister comprises a short cylinder 25 mounted in the upper end of the head plate 23, between the curved cheeks 26. The cylinder 25 has formed upon it the gear teeth 27 which are adapted to engage with the teeth on the hand-wheel 28. The twister is held in position in the head-plate 23 by the face plate 29 and the reduced hub of the twister passes through and is supported in the said face plate. The twister has a central longitudinal bore and opening outwardly therefrom to the surface of the twister is the longitudinal main slot 30. The front face of the twister is recessed to form a guide for a removable gripping plate 31, which has a gripping slot 32 adapted to register with the main slot 30 in the twister, and of such length that when the plate 31 is in place the lower edge of the slot 32 is just below the axial center of the longitudinal bore in the twister. It is intended to provide the machine with a number of plates 31 having slots of different widths corresponding to different gages of wire, thus insuring a firm grip upon the wire during the twisting operation whatever the gage of wire employed. For the purpose of ejecting from the bore of the twister a small piece of wire that remains after the twisting operation, we provide a spring plate 33 bolted to the plate 29 and surrounding the hub of the twister. This plate has a lateral projection 34 which extends into the path of movement of the cam 35 on the hand-wheel 28 so that immediately after the cutting operation the spring plate is thrown outwardly to eject the short piece of wire. In front of the twister is mounted a reciprocating knife 36 which is held in place by the base portion of one of the arms 24 bolted to the head-plate, and by the face-plate 37 secured to the head-plate by screws as shown in Fig. 2. On the other cheek-plate 26 of the head-plate is pivoted a gripping dog 38. This gripping dog is provided with a handle to turn it on its pivot, and a gripping notch which engages the wire to draw it down below the upper edge of the bundle and tighten it, and to hold it in position during the twisting operation. The face plate 37 has a vertical guide groove in which is mounted the grooved guide roller 39 coacting with the dog 38, and the plain guide roller 40.

The mechanism for operating the cutting knife 36 will be understood from the examination of Figs. 2 and 8, from which it will be seen that the shaft of the hand gear wheel 28 extends through the bracket 41 extending from the head plate 23 and has on its front end a slot in which is secured a wiper-cam 42. Pivoted adjacent to the wiper-cam is a pendular detent 43, which engages the knife 36 to reciprocate it. Secured at one end to the knife 36 and at the other end to the face of bracket 41 is a spring 44 adapted to retract the knife. When the hand-wheel is turned in a counter clockwise direction (as seen in Fig. 2) the wiper-cam strikes the detent 43 and forces the knife past the face of the twister and cuts off the twisted wire, and on further rotation of the hand wheel the wiper-cam passes the detent 43 and the knife is retracted by the spring 44. The detent 43 and the wiper-cam also form a stop for the hand-wheel when it is rotated in a clock-wise direction, and the parts are so arranged that when the wheel is brought to a stop, as shown in Fig. 2, the slot 30 in the twister registers with the slot between the cheek-plates 26 of the head-plate.

The wire reel is supported solidly in the frame in the standards 45, and the wire is guided into the twister through a guide hole in the end of the bent arm 46 which is secured to the carrier plate 23. After passing through this guide hole the wire passes over a grooved roller 47 also mounted in the bent arm 46, and thence into the twister. The wire may be clamped on the wheel 47 by the clamping cam 48. The wire reel is made up of a plate secured to the axle 49 and having the arms 50 containing the radial slots 51. In these slots and adapted to be locked in any position therein by the bolts 52 are curved horns 53 adapted to support the wire. The shaft carrying the wire reel is turned by the hand-wheel 54. It is of great importance in the operating of a machine of this character that the wire should not be kinked and to this end it is desirable to provide means for readily getting the wire coil onto the reel without tangling it. This may be accomplished with the construction shown in which the horns 53 are brought toward the center of their arms 50 and the wire slipped over the ends of them, whereupon the horns are moved outwardly to properly hold the wire coil. These horns are readily adjustable to any size of wire coil. Another thing which tends to tangle or kink the wire is that when the wire is pulled off the reel, if the reel runs loosely, the momentum of it reels off too much wire and that extra wire becomes kinked. To prevent this I provide the stiff coiled spring 55 between the hub of the reel and a flat stationary plate 56, this spring creating sufficient friction to prevent the reel from running too freely, or overrunning.

The machine is operated in the following manner. After the coil of wire has been placed on the reel in the manner described, the wire is drawn through the guide in the arm 46 and between the roller 47 and the gripping cam 48 and enough wire is drawn out over the roller table to form a loop large enough to freely surround the bundle. The lower edge of this loop is steadied in the guide-slot formed by the two rollers in the roller table and the free end of the wire is passed up over the guide-roller 39 and into the twister, it being passed through the cylindrical bore in the twister and turned over at the end as shown in Fig. 8. The wire is then pressed down into the lower gripping portion of the slot in the plate 31, thus securing the loose end of the wire and leaving a loop above the roller table. The bundle to be tied is then slid onto the table through the loop and the treadle 20 is depressed to bring the arm 24 down on top of the bundle and press it against the roller table. The parts are so set that when the treadle is depressed until the toggle 21 forms a straight line, the bundle is sufficiently compressed, but the treadle is carried over the dead point of the toggle, as shown in Fig. 6, thus locking the parts in position. After the bundle has been so clamped, the wire is drawn tight by rotating the wire reel backwardly with a jerked motion, if necessary, to tightly draw the wire about the bundle. During this operation the free end of the wire is held in the gripping plate and the wire running to the reel is drawn down into the slot in the gripping plate 31 above the free end of the wire and passes freely through the cylindrical bore in the twister. After the wire has thus been drawn as tight as possible the gripping cam 48 is thrown into gripping position, thus locking the wire between the cam and the roller 47, and holding it tight about the bundle. The locking dog 38 is thereupon forced down until it engages the guide roller 39, which, owing to the position of the arms 24 on the carrier plate, is considerably below the upper edge of the bundle. This movement further tightens the wire about the bundle and brings the point of twist below the upper edge thereof. During this operation the locking cam 48 prevents withdrawal of the wire from the reel and necessitates a further tightening of the wire about the bundle. The parts having been brought into this position and the wire drawn as tightly as possible about the bundle, the handle wheel 28 is rotated to impart rotation to the twister and twist the wire. During the last portion of this movement the wiper cam 41 actuates the knife 36 to cut off the wire and immediately thereafter the cam 35 engages the projection 34 from the spring plate 33 and throws out the small bent piece of wire lying in the twister. Thereupon the treadle is lifted to throw the toggle over the center and the parts are released and ready for another operation.

In the above described operation the latch 8 may be used to close the end of the slot in the roller table and thereby helping to support the loop in the wire. When, however, it is desired to wrap a long bundle, such, for example, as a bundle of flooring or molding in which it is necessary to wrap the bundle with wire in several places, it is impossible to form a second loop in the manner just described and in such case the latch 8 is lifted so that the wire may be drawn over the top of the bundle and laid into the slot between the rollers on the table and then brought up on the inside and fastened in the twister as before described. It will, of course, be understood that the latch 8 may be entirely dispensed with, since it forms merely a convenient means for more completely supporting the wire loop.

The machine above described is adapted for use in the bundling of all sorts of lumber and the like and may be employed with advantage for applying wire bands to wooden boxes for the purpose of protecting them in transit from being opened by unauthorized persons and robbed of their contents.

Having thus described our invention, what we claim is:—

1. In a bundling machine, a table for supporting the bundle, a sliding head-plate in proximity to the table, presser-arms carried by the head-plate and extending over the table for compressing the bundle on the table when the head-plate is depressed, a rotatable wire-twister carried by the head-plate and positioned therein to come into close proximity with the bundle when the head-plate is depressed to compress the bundle, said twister being adapted to retain both ends of a wire loop, a narrow guide-slot in the table in line with the twister, and mechanism for rotating the twister, whereby a loop may be formed and held at right angles to the face of the head-plate and may be tightly bound about a bundle compressed between the presser-arms and the table and against the head-plate.

2. In a bundling machine, a table for supporting the bundle, a wire twister adapted to be brought into proximity to a bundle on the table, a guide slot in the table for the binding wire, and means for closing and opening the outer end of said slot.

3. In a bundling machine, a table for supporting the bundle, provided with a series of rollers, a sliding head-plate in proximity to the table, presser arms carried by the head-plate and extending over the table for compressing the bundle on the table when the head-plate is depressed, a rotatable wire twister carried by the head-plate and positioned therein to come into close proximity with the bundle when the head-plate is depressed to compress the bundle, said twister being adapted to retain both ends of a wire loop, the rollers on the table being so arranged that two of them are in close proximity directly beneath the wire twister thereby forming a narrow guide-slot for the binding wire, and mechanism for rotating the twister, whereby a loop may be formed and held at right-angles to the face of the head-plate and may be tightly bound about a bundle compressed between the presser-arms and the table and against the head-plate.

4. In a bundling machine, a table for supporting the bundle, a wire twister adapted to be brought into proximity to a bundle on the table and a wire clamp adapted to clamp the wire close to the bundle during the twisting operation.

5. In a bundling machine, a table for supporting the bundle, a twister, an adjustable support for said twister, whereby it may be brought into proximity to a bundle on the table, a grooved guide roller on said support arranged substantially on the axis of the twister, a second guide roller below the first roller, a guide slot for the binding wire in the table, and a wire clamp on the said support adapted to clamp the wire against the grooved roller during the twisting operation.

6. In a bundling machine, a table for supporting the bundle, a sliding head-plate in proximity to the table and having a guide-slot for the binding wire, presser arms carried by the head-plate and extending over the table for compressing the bundle on the table when the head-plate is depressed, a rotatable wire twister carried by the head-plate in line with the guide-slot therein and positioned to come into close proximity with the bundle when the head-plate is depressed to compress the bundle, said twister being adapted to retain both ends of a wire loop, a narrow guide-slot in the table in line with the twister and the guide-slot in the head-plate and mechanism for rotating the twister, whereby a loop may be formed and held at right-angles to the face of the head-plate and may be tightly bound about a bundle compressed between the presser-arms on the table and against the head-plate.

7. In a bundling machine, a table for supporting the bundle, a twister, a support in which the twister is mounted, means for reciprocating the support in proximity to the table, bundle-clamping arms secured to said support above the twister, whereby the twister is brought below the upper edge of the bundle for the twisting operation, and means for forcing the upper strand of the wire down to the twisting position.

8. In a bundling machine, a table for supporting the bundle, a twister, a support in which the twister is mounted, means for reciprocating the support in proximity to the table, the parts being so constructed and arranged that the twister may be brought below the upper edge of the bundle for the twisting operation, and means for forcing the upper strand of the wire down to the twisting position.

9. In a bundling machine, a table for supporting the bundle, and a sliding head-plate in proximity to the table, presser-arms carried by the head-plate and extending over the table for compressing the bundle on the table when the head-plate is depressed, a rotatable wire twister carried by the head-plate and positioned therein below the lower edge of the presser-arms so that when the head-plate is depressed to compress the bundle the twister is brought below the lower edge of the bundle and in close proximity thereto, mechanism for rotating the twister, and mechanism for forcing the upper strand of the wire down to the twisting position.

10. In a bundling machine, a table for supporting the bundle, a wire-twister adapted to be brought into proximity to a bundle on the table, mechanism for cutting off the wire after the twist, and mechanism for ejecting from the twister the small piece of wire left therein.

11. In a bundling machine, a table for supporting the bundle, a wire-twister adapted to be brought into proximity to the bundle on the table, a hand-wheel for rotating the twister to twist the wire, a cutting knife actuated by the hand-wheel for cutting off the wire after the twist, and mechanism subsequently actuated by the hand-wheel for ejecting from the twister the small piece of wire left therein.

12. In a bundling machine, a table for supporting the bundle, a twister, a head-plate in which the twister is mounted, mechanism for reciprocating the head-plate in proximity to the table, an arm having a guiding hole for the wire attached to the head-plate, a guide wheel on the arm between the guiding hole and the twister, and a gripping cam pivoted on the arm above the guide-wheel for gripping the wire against said wheel; substantially as described.

13. In a bundling machine, a table for supporting the bundle, a head-plate, adjustable mechanism for reciprocating the head-plate, a twister carried by said plate, clamping arms extending from the head-plate for clamping the bundle on the table, the lower surface of the clamping arms being above the axis of the twister, whereby the twist is brought below the upper edge of the bundle, means for gripping the free end of the wire in the twister, mechanism at the back of the head plate for gripping the wire after it has been drawn tight about the bundle and through the twister, mechanism for depressing the tightened wire from the upper edge of the bundle to the axis of the twister, and mechanism for rotating the twister and cutting off the wire; substantially as described.

14. In a bundling machine, a table for supporting the bundle, a head-plate, adjustable mechanism for reciprocating the head-plate, a twister carried by said plate, clamping arms extending from the head-plate for clamping the bundle on the table, the lower surfaces of the clamping arms being above the axis of the twister, whereby the twist is brought below the upper edge of the bundle, a gripping plate in the twister for gripping the free end of the wire, a wire reel which may be rotated backwardly to draw the wire about the bundle, a gripping cam between the twister and the wire reel for gripping the wire after it has been tightened, a gripping dog for depressing the wire from the upper edge of the bundle to the axis of the twister, a hand-wheel mounted on the head-plate for imparting rotation to the twister, a knife reciprocated by the said hand-wheel in front of the face of the twister to sever the wire, a spring plate surrounding the hub of the twister, at the other end thereof, and a cam on the hand-wheel for actuating the spring-plate after the cut to eject the small piece of wire left in the twister; substantially as described.

In testimony whereof we affix our signatures, in presence of two witnesses.

ROBT. C. LOWRY.
LOUIS F. WINTER.

Witnesses:
L. A. COLEMAN,
WILLIAM H. DAVIS.